(12) United States Patent
Shin

(10) Patent No.: US 6,338,871 B1
(45) Date of Patent: Jan. 15, 2002

(54) COLORED SILICA SAND

(76) Inventor: Bong Hang Shin, 467 Puuikena Dr., Honolulu, HI (US) 96821

( * ) Notice: Subject to any disclaimer, the term of this patent is extended or adjusted under 35 U.S.C. 154(b) by 0 days.

(21) Appl. No.: 09/560,934

(22) Filed: Apr. 30, 2000

(51) Int. Cl.⁷ .............................. B05D 1/12; B05D 7/00; B05D 5/02

(52) U.S. Cl. ........................ 427/218; 427/180; 427/204; 427/212; 427/215; 427/221; 427/242; 427/425; 52/515

(58) Field of Search ................................. 404/108, 110, 404/111; 427/4, 3, 212, 216, 270, 140, 263, 264, 180, 186, 189, 203, 204, 215, 218, 221, 280, 281, 421; 428/15; 524/44, 45; 52/515

(56) References Cited

U.S. PATENT DOCUMENTS

| | | | | |
|---|---|---|---|---|
| 3,935,339 A | * | 1/1976 | Cooke, Jr. | 427/216 |
| 3,991,225 A | * | 11/1976 | Blouin | 427/3 |
| 4,031,282 A | * | 6/1977 | McClinton | 428/141 |
| 4,868,018 A | * | 9/1989 | Schiffer | 428/15 |
| 4,975,303 A | * | 12/1990 | McKinnon | 427/263 |
| 5,169,884 A | * | 12/1992 | Lindemann | 524/44 |
| 5,447,752 A | * | 9/1995 | Cobb | 427/270 |
| 5,895,173 A | * | 4/1999 | O'Brien et al. | 404/108 |

* cited by examiner

*Primary Examiner*—Shrive Beck
*Assistant Examiner*—Wesley Markham
(74) *Attorney, Agent, or Firm*—Michael I Kroll

(57) ABSTRACT

A method of coloring silica sand for use in coating a surface. The method includes the steps of selecting silica sand of a desired grain size and color, the preferred color being substantially white and grain size being any combination of thirty, fifty and eighty mesh. A coating having adhesive qualities is then prepared by one of air drying acrylic and vinyl emulsions or thermosetting phenolic, polyester and epoxy emulsions. To coat the silica sand, the silica sand to tumble or fall from an elevated position and is sprayed as it tumbles or falls with the prepared coating. The coated silica sand is then pulverized to break up clumped particles formed during application of the coating. A desired color mixture is obtained by mixing coated silica sand of different colors. The coated silica sand is then applied to a desired surface by one of spraying or using a trowel. Titanium dioxide may now be applied to the mixture after application to alter a gloss of the mixture.

9 Claims, 5 Drawing Sheets

COLORED SILICA SAND

BACKGROUND OF THE INVENTION

1. Field of the Invention

The present invention relates generally to silica sand and, more specifically, to a method of coloring silica sand to a desired color.

2. Description of the Prior Art

Numerous types of silica sand compositions have been provided in the prior art. For example, U.S. Pat. Nos. 4,041,000; 5,364,672 and 5,634,307 all are illustrative of such prior art. While these units may be suitable for the particular purpose to which they address, they would not be as suitable for the purposes of the present invention as heretofore described.

U.S. Pat. No. 4,041,000

Inventor: Alexander Farcnik

Issued: Aug. 9, 1977

The improved fireproof liquid coating composition of the present invention includes water in a substantial proportion as a base or vehicle, in which silica sand, fire clay or the like silica-containing material is dispersed, along with granular zinc oxide, a selected silicate binder and suspending agent such as calcium silicate or sodium silicate, and a minor concentration of a thermoplastic resin binder and suspending agent, such as polyvinyl acetate. An alkali metal fluorosilicate can also be present, if desired, to help dry the composition when it is applied to a surface to be protected against fire, rain and other elements. Moreover, coloring agents, preferably selected inorganic oxides, can also be present to suitably color the composition. The composition is simple to make up, inexpensive, easy to apply and highly effective when dried on a surface as a hard fire protective durable layer.

U.S. Pat. No. 5,364,672

Inventor: Andreas Schultze-Kraft

Issued: Nov. 15, 1994

Artificial stones from finely divided glass fragments and artificial resins and having a great similarity to natural stones under optical, weight-related and tactile-esthetical aspects consist of 15–30% by weight of a transparent cured or thermoplastically deformed synthetic resin which may be dyed, 10–80% by weight of white, green, brown or mixed fragmented and/or granulated waste glass of grain sizes of from 0.05–3 mm, 0–40% by weight of transparent, opaque or strongly colored fragmented and/or granulated new glass having grain sizes of from 0.05 to 3 mm, 0–75% by weight of transparent, opaque or strongly colored ground material having grain sizes of from 0.05 to 3 mm, produced from 80–92 parts by weight of waste glass having sizes of from 0.05 to 0.3 mm and 8 to 20 parts by weight of curable synthetic resin, 0 to 35% by weight of inorganic fillers selected from the group of silica sand, quartz meal, stone meal, natural or synthetic ground and/or granulated silicates having grain sizes from 0.05 to 3 mm, and 0 to 0.5% by weight of dyes and colored pigments.

U.S. Pat. No. 5,634,307

Inventor: Jean-Paul Larriberot et al.

Issued: Jun. 3, 1997

A stone-like coating is applied to architectural structures to closely simulate stonework both as to appearance and feel, the coating being applied in successive layers, with the outer surface of the coating being sculpted, configured or colored to imitate the appearance of stonework. The coating is provided by an aqueous composition comprising about one part by weight portland white cement, about 0.9 to 1.1 parts by weight white silica sand, about 1.8 to 2.2 parts by weight limestone sand, and about 0.9 to 1.1 parts by volume acrylic liquid solution. The aqueous composition is capable of being adhered to an exterior surface of a structure, and, upon curing, solidifies into a layer of stone-like composition exhibiting high compressive strength.

SUMMARY OF THE PRESENT INVENTION

The present invention relates generally to silica sand and, more specifically, to a method of coloring silica sand to a desired color.

A primary object of the present invention is to provide a method of coloring silica sand that will overcome the shortcomings of prior art devices.

Another object of the present invention is to provide a method of coloring silica sand which is able to change a color of silica sand to that desired by a user.

A further object of the present invention is to provide a method of coloring silica sand which is able to color silica sand by applying a colored coating thereto.

A yet further object of the present invention is to provide a method of coloring silica sand wherein the color of the silica sand is changed by mixing with a polymer containing a soluble silicate dye.

A still further object of the present invention is to provide a method of coloring silica sand wherein the pretreated silica sand is preferably white in color.

A further object of the present invention is to provide a method of coloring silica sand wherein differently colored grains of silica sand are mixed to form a desired coloring, e.g. a granite-like color coating.

A further object of the present invention is to provide a method of coloring silica sand wherein coating covering the colored silica sand is able to adhere to a surface.

An even further object of the present invention is to provide a method of coloring silica sand wherein the colored silica sand is used for coating a surface located either inside or outside a structure.

Another object of the present invention is to provide a method of coloring silica sand that is simple and easy to use.

A still further object of the present invention is to provide a method of coloring silica sand that is economical in cost to manufacture.

Additional objects of the present invention will appear as the description proceeds.

A method of coloring silica sand for use in coating a surface is disclosed by the present invention. The method includes the steps of selecting silica sand of a desired grain size and color, the preferred color being substantially white and grain size being any combination of thirty, fifty and eighty mesh. A coating having adhesive qualities is then prepared by one of air drying acrylic and vinyl emulsions or thermosetting phenolic, polyester and epoxy emulsions. To coat the silica sand, the silica sand to tumble or fall from an elevated position and is sprayed as it tumbles or falls with the prepared coating. The coated silica sand is then pulverized to break up clumped particles formed during application of the coating. A desired color mixture is obtained by mixing coated silica sand of different colors. The coated silica sand is then applied to a desired surface by one of spraying or using a trowel. Titanium dioxide may now be applied to the mixture after application to alter a gloss of the mixture.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
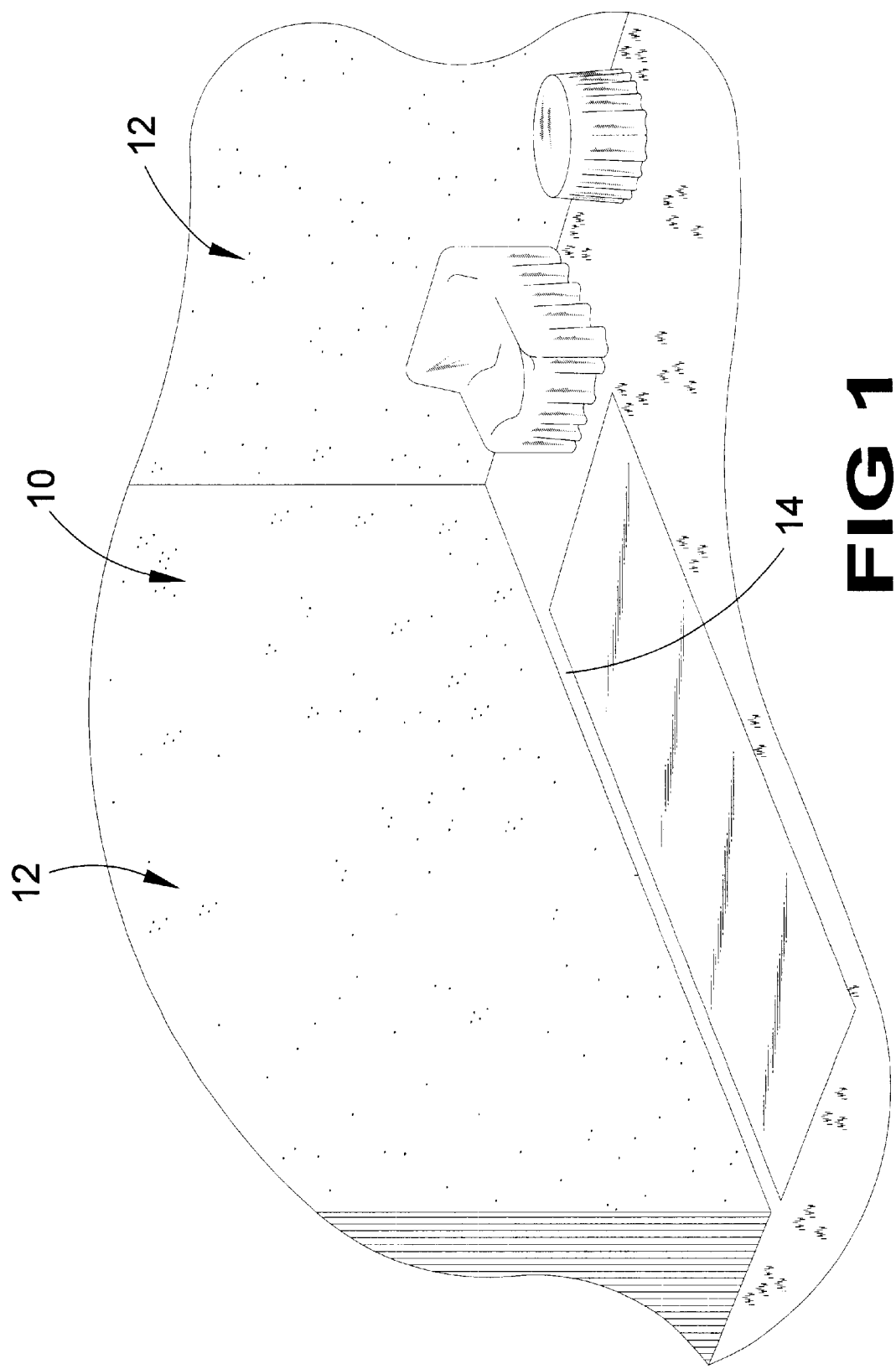
FIG. 1 is a front perspective view of an inside wall of a structure coated with colored silica sand formed by the method of coloring silica sand of the present invention.

Turning now descriptively to the drawings, in which similar reference characters denote similar elements throughout the several views, the Figures illustrate the method of coloring slica sand of the present invention. With regard to the reference numerals used, the following numbering is used throughout the various drawing figures.

10 room
12 wall within room
14 colored silica sand covering inside wall
16 structure
18 outside wall of structure
20 colored silica sand covering outside wall
22 doorway of structure

DETAILED DESCRIPTION OF THE PREFERRED EMBODIMENT

Turning now descriptively to the drawings, in which similar reference characters denote similar elements throughout the several views, FIGS. 1 through 5 illustrate the colored silica sand and method of producing the colored silica sand according to the present invention.

FIG. 1 illustrates a room 10 having walls 12 defining the boundaries thereof. Each of the walls 12 are coated with a mixture of colored silica sand 14. The colored silica sand 14 was formed according to the method of coloring silica sand of the present invention. The use of silica sand to form the coating for a surface provides a thicker and more stable coating than prior art coatings. This enables the coating to be more durable and wear resistant. Therefore, the coating will last longer and be able to provide additional resistance to normal wear and tear such as when children play in the room 10. Forming the coating using a silicate base, e.g. silica sand, is very cost efficient. Furthermore, the silica sand 14 is colored according to the method of coloring silica sand of the present invention to provide a more natural stone like appearance that adds to the finishing coat and the appearance of the room being coated thereby.

Figure 2:
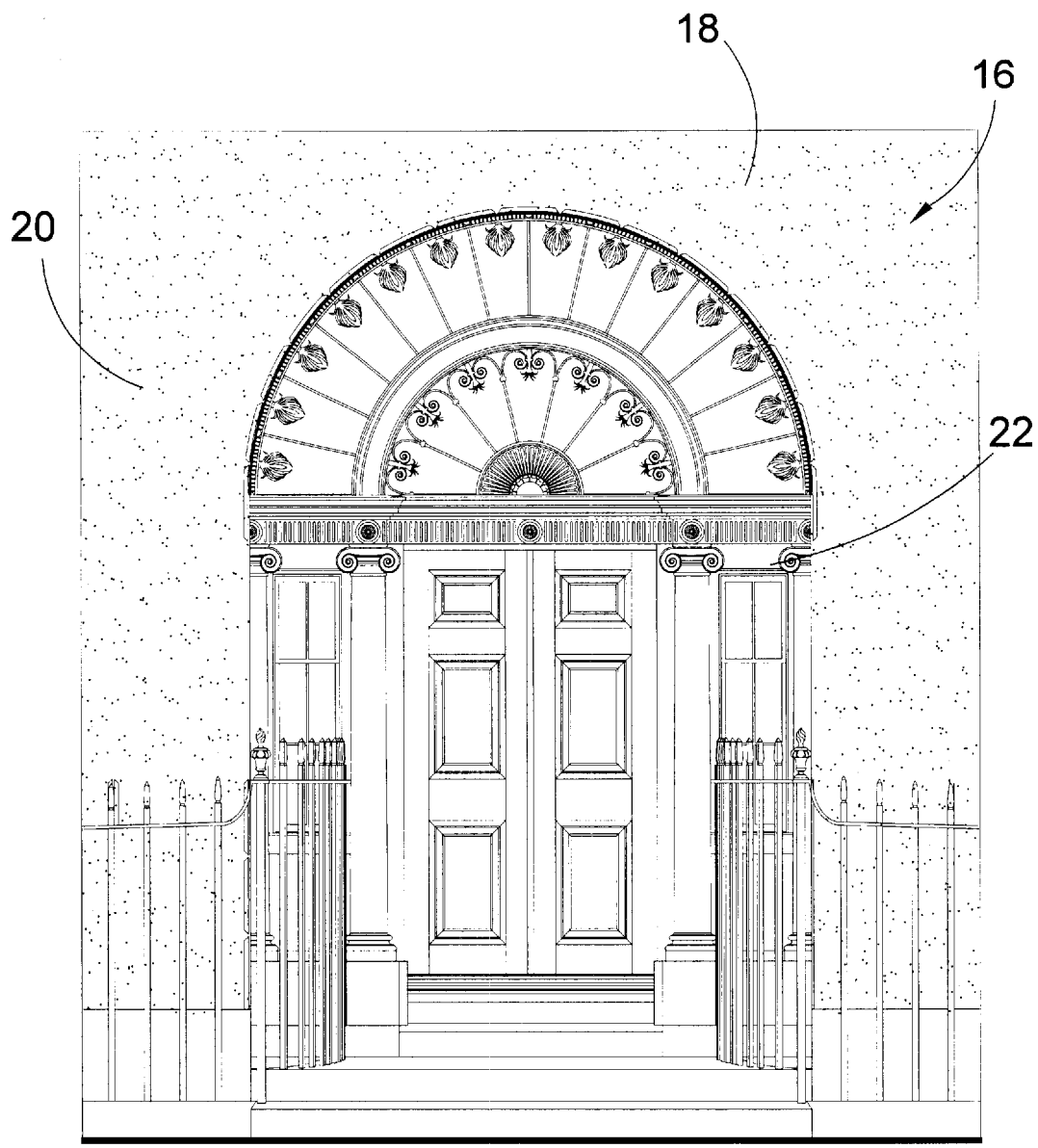
FIG. 2 is a front perspective view of an outside wall of a structure coated with colored silica sand formed by the method of coloring silica sand of the present invention.

An outside view of a structure 16 is shown in FIG. 2. The structure 16 includes outside walls 18 which are exposed to the elements. The outside walls 18 of the structure 16 are coated with a mixture of colored silica sand 20 formed in accordance with the method of the present invention. The figure shows the colored silica sand 20 coating the outside wall 18 surrounding a doorway 22 of the structure 16. The colored silica sand is durable, weather resistant and resists fading. Thus, coating the outside of a structure with silica sand colored according to the method of the present invention not only protects the struture from the elements but also maintains the appearance of the structure over a prolonged period of time.

Figure 3:
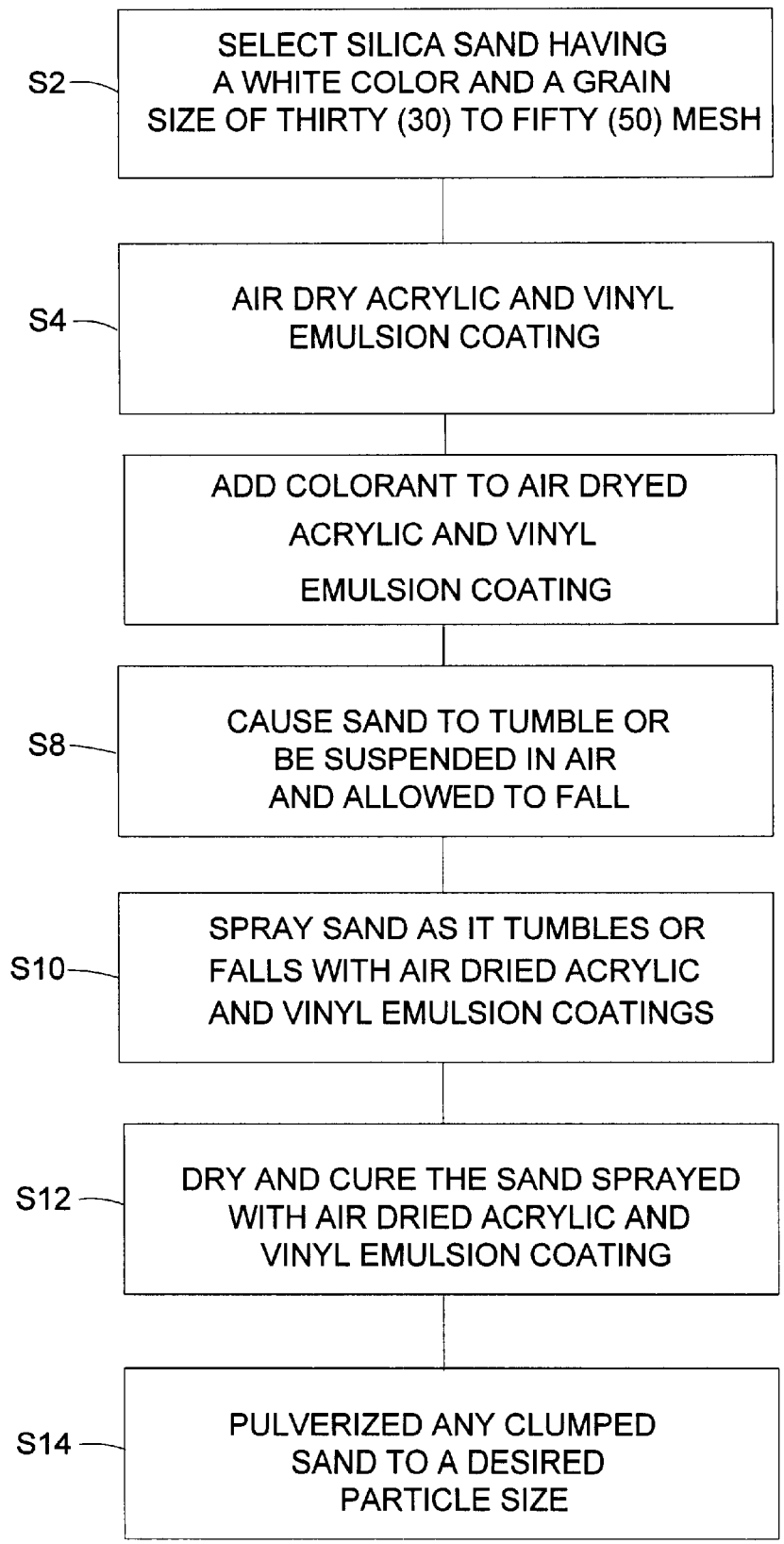
FIG. 3 is flow diagram illustrating the method of coloring silica sand of the present invention using air dried acrylic and vinyl emulsion coatings.
Figure 4:
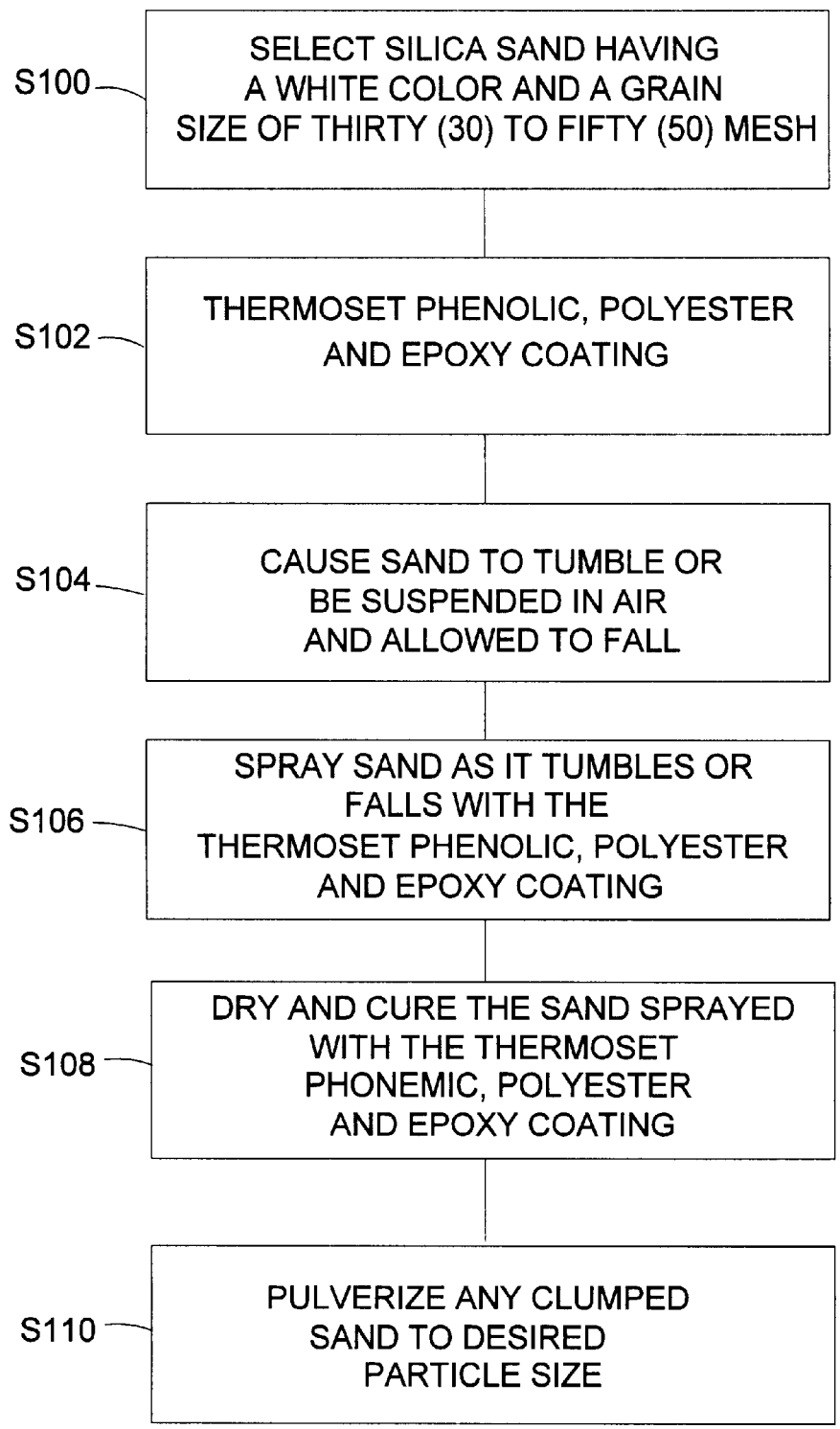
FIG. 4 is flow diagram describing the method of coloring silica sand of the present invention using thermoset phenolic, polyester and epoxy coatings.
Figure 5:
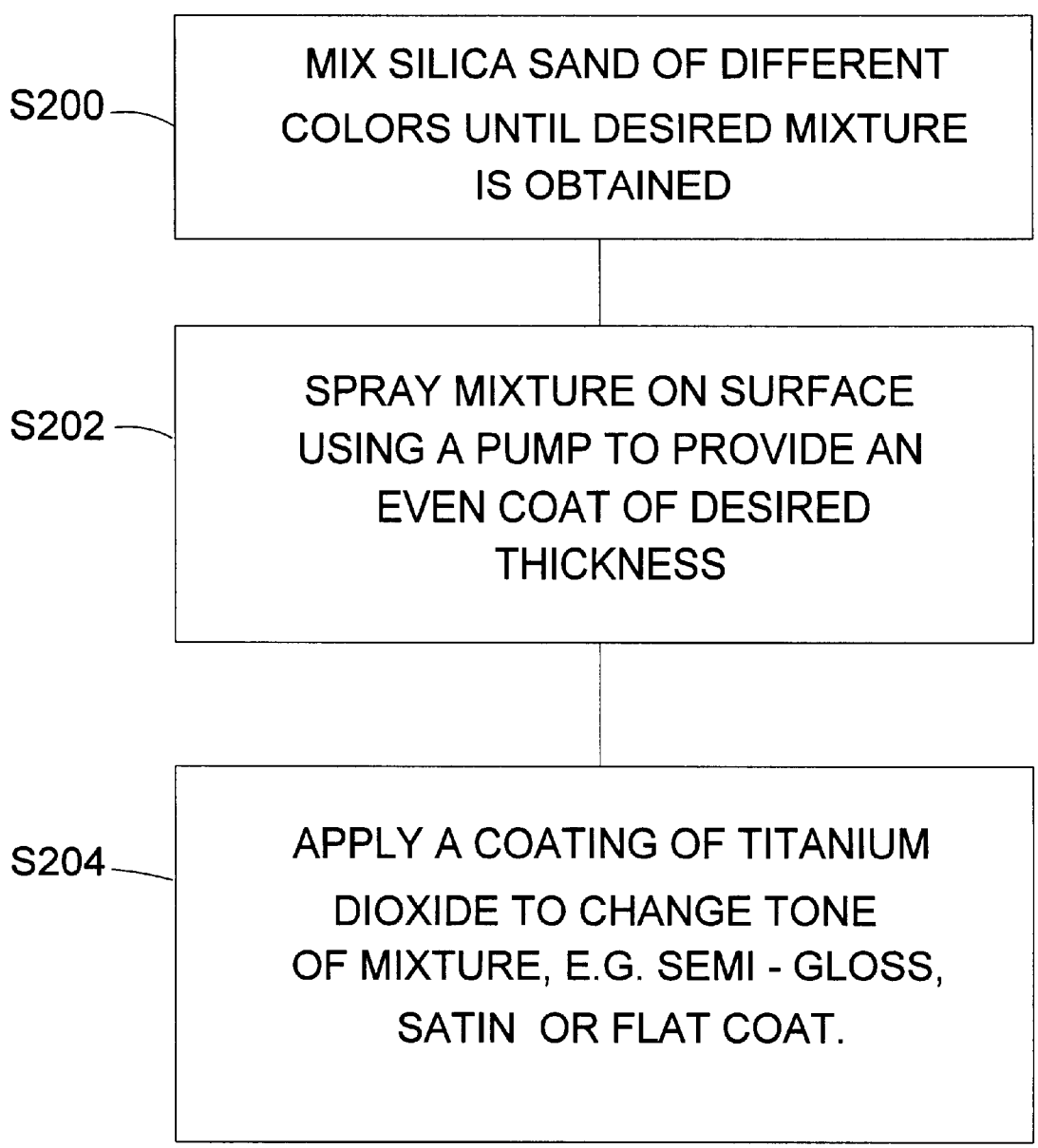
FIG. 5 is flow diagram describing application of colored silica sand mixture formed by the method of coloring silica sand of the present invention to a surface.

The method of coloring silica sand according to the present invention is shown in the flow charts of FIGS. 3, 4 and 5. The flow charts of FIGS. 3 and 4 discuss the method for coating the colored silica sand to thereby color the silica sand. The flow chart of FIG. 5 discusses mixing the colored silica sand to form a desired color mix and applying the mixture to coat surfaces such as the inside walls 12 of the room 10 shown in FIG. 1 and the outside wall 18 of the structure 16 shown in FIG. 2.

FIG. 3 is a flow chart illustrating the method of coloring silica sand using acrylic and vinyl emulsion coatings. In order to color the silica sand, grains of silica sand having a desired color and grain size must be selected as described in step S2. Preferably, the silica sand chosen for coloring by the method of the present invention has a natural white color. Generally, silica sand has a natural color shade between white and amber. As the actual color of silica sand is unable to be changed, the color change must be affected by coating the silica sand. When starting out with silica sand having a base color of white, it is easier to obtain color coating which meets the desired specifications for a final color. Use of an off white color for the silica sand will cause shading and discoloration of the coating and thus make it more difficult to obtain the exact color specifications. As also stated in step S2, it is important to chose silica sand having a specific minimum grain size. The preferable grain size for performing the method of the present invention is thirty (30) to fifty (50) mesh. It is also possible to use silica sand having a grain size of eighty (80) mesh. However, it is easier to apply the colored coating to larger grains of silica sand and it is more economical to use sand of larger grain sizes, e.g. thirty (30) to fifty (50) mesh. However, it is possible to use the smaller grain sizes, e.g. eighty (80) mesh, if a smoother texture is desired for the coating. Use of other grain sizes is also possible but not as cost effective or functional as silica sand having a grain size of thirty (30) to fifty (50) mesh.

The acrylic and vinyl emulsion coating is then formed by air drying as discussed in step S4. There are two different forms of copolymers that can be used, dry or liquid, with the most effective being a liquid ethylene vinyl acetate copolymer. The preferred liquid form of EVA's contain 53%±1% water, has the desired consistency and has great bonding strength. The solid form of EVA's are easier to handle and can be easily mixed with water, but the precision needed to mix water with the EVA may not be feasible in all situations.

This process requires nominal heating of the acrylic and vinyl emulsion coating and thus is very cost effective. A colorant is then added to the air dried acrylic and vinyl emulsion coating to obtain the desired color for coating the silica sand. The dye or pigment added as a colorant is usually mixed with the silica sand at a 0.1–0.4% weight ratio. If a greater weight ratio is used, a build up of excess dye or pigment in the tumbling machine can occur. Generally, after coating and hardening of the dye or pigment, a dye or pigment weight ratio of 0.075% is optimal. In order to apply the coating of air dried and colored acrylic and vinyl emulsion coating to the silica sand with a minimal amount of clumping, the silica sand is caused to tumble or is suspended in air and allowed to fall as described in step S8. As the silica sand is tumbling or falling, it is sprayed with the colored acrylic and vinyl emulsion coating as stated in step S10. The silica sand is thus coated by the spray of colored acrylic and vinyl emulsion coating as it tumbles or falls. The coated silica sand is then dried and cured to secure the coating thereto as discussed in step S12. Should any silica sand clump together due to the adhesive qualities of the colored acrylic and vinyl emulsion coating, the clumped silica sand is pulverized as described in step S14 to break up the clumps and obtain a desired particle size for the silica sand. Once pulverized to remove the clumps, the coated silica sand is ready for application to a structure.

Alternatively, the silica sand may be coated with phenolic, polyester or epoxy emulsion coatings. Coloring the silica sand by coating with such phenolic, polyester or epoxy emulsion coatings is described in the flow chart of FIG. 4.

In order to color the silica sand, grains of silica sand having a desired color and grain size must be selected as described in step S100. Preferably, the silica sand chosen for coloring by the method of the present invention has a natural white color. Generally, silica sand has a natural color shade between white and amber. As the actual color of silica sand is unable to be changed, the color change must be affected by coating the silica sand. When starting out with silica sand having a base color of white, it is easier to obtain a color coating which meets the desired specifications for a final color. Use of an off white color for the silica sand will cause shading and discoloration of the coating and thus make it more difficult to obtain the exact color specifications. As also stated in step S100, it is important to chose silica sand having a specific minimum grain size. The preferable grain size for performing the method of the present invention is thirty (30) to fifty (50) mesh. It is also possible to use silica sand having a grain size of eighty (80) mesh. However, it is easier to apply the colored coating to larger grains of silica sand and it is more economical to use sand of larger grain sizes, e.g. thirty (30) to fifty (50) mesh. However, it is possible to use the smaller grain sizes, e.g. eighty mesh, if a smoother texture is desired for the coating.

The phenolic, polyester or epoxy emulsion coating is then formed by thermosetting as discussed in step S102. This process requires heating of the phenolic, polyester or epoxy emulsion coating to a high temperature, generally from 100–150° Celsius. This process is thus less cost effective than using the air dry method for preparing the acrylic and vinyl emulsion coating. In order to apply the coating of the thermoset phenolic, polyester or epoxy emulsion coating to the silica sand with a minimal amount of clumping, the silica sand is caused to tumble or is suspended in air and allowed to fall as described in step S104. As the silica sand is tumbling or falling, it is sprayed with the phenolic, polyester or epoxy emulsion coating as stated in step S106. The silica sand is thus coated by the spray of the phenolic, polyester or epoxy emulsion coating as it tumbles or falls. The coated silica sand is then dried and cured to secure the coating thereto as discussed in step S108. Should any silica sand clump together due to the adhesive qualities of the phenolic, polyester or epoxy emulsion coating, the clumped silica sand is pulverized as described in step S110 to break up the clumps and obtain a desired particle size for the silica sand. Once pulverized to remove the clumps, the coated silica sand is ready for use.

FIG. 5 is a flow chart describing the application of the colored silica sand to a surface. In order to apply the colored silica sand, a mixture of the desired color must first be formed. The mixture would be of colored silica sand coated with different color coatings. The different colored silica sand is mixed together until the desired mixture such as a gravel like appearance is obtained as discussed in step S200. The mixture of colored silica sand is the sprayed on the surface to be coated to provide an even coat of a desired thickness as stated in step S202. Alternatively, the colored silica sand may be applied with a trowel. Spraying is recommended because it is more expedient. Furthermore, a trowel may cause air bubbles to form in the coating while spraying does not have this problem. Spraying is most efficiently accomplished with a pump of at least five horsepower and continuous pressure of 25–35 psi and a nozzle of 6 mm. A coating to be applied outdoors should have a preferred thickness of 2 mm but for indoor coating the coating should be as thick as deemed needed. For application of the coating the ratio of copolymer or EVA or colored EVA to silica sand or colored silica sand is preferably 5 to 17±1. The coating of titanium dioxide may then be applied to the coating of silica sand to change the tone of the mixture to have a semi-gloss, satin or flat appearance as described in step S204. As the coating on the silica sand is adhesive in nature, the coated silica sand will adhere and bond to the surface on which it is sprayed. The silica sand is thus coating and protecting the surface to which it is adhered.

This coating has been shown to have minimal fading for up to twenty years and is weather resistant. Its properties have shown to be fire resistant to some degree and it is very resiant to chemical reactions caused by changing weather. The coating is easily kept clean with application of water and is resistant to retaining odors, i.e. smoke. Depending on the amount of water in the product, it can adhere to most construction materials such as wood, cement, PVC pipe, metal, etc. This product has a smoother look and more design possibilities than other cement or silicate based coatings. It is also easy to do repairs to with a simple reapplication.

From the above description it can be seen that the method of coloring silica sand of the present invention is able to overcome the shortcomings of prior art devices by providing a method of coloring silica sand which is able to change a color of silica sand to that desired by a user by applying a colored coating thereto, the color of the silica sand being changed by mixing with a polymer containing a soluble silicate dye. The method of coloring silica sand uses silica sand that is preferably white in color. The method of coloring silica sand mixes differently colored grains of silica sand to form a desired coloring, e.g. a granite-like color coating. The coating has adhesive properties allowing the silica sand to adhere to a surface. The colored silica sand is used for coating a surface located either inside or outside a structure. Furthermore, the method of coloring silica sand of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of coating a wall of a building comprising the steps of:
    a) selecting a natural white silica sand with a grain size in the range of thirty to fifty mesh;
    b) preparing a coating having adhesive qualities and containing a colorant, said coating comprising liquid EVA copolymer containing about 53% plus or minus 1% water;
    c) causing the silica sand to tumble or fall from an elevated position;
    d) spraying the silica sand as it tumbles or falls with the prepared coating to obtain a mixture consisting of said silica sand coated with the prepared coating containing said colorant; and
    e) applying the mixture of coated silica sand to a surface on a wall of a building in a coating having a thickness of substantially 2 mm.

2. The method of claim 1, further comprising the step of pulverizing the coated silica sand to break up clumped particles formed during application of the coating.

3. The method of claim 2, further comprising the step of mixing coated silica sand of different colors to form a desired mixture.

4. The method of claim 1, wherein said step of applying includes the step of spraying said mixture on said surface of said wall.

5. The method of claim 1, wherein said step of applying includes spraying the mixture to the surface at a pressure of substantially 25–35 psi.

6. The method of claim 1, wherein said mixture is applied using a trowel.

7. The method of claim 1, wherein said mixture is applied to an inside wall of a room.

8. The method of claim 1, further comprising the step of applying titanium dioxide to said mixture after application to alter a gloss of the mixture.

9. The method of claim 8, wherein the gloss is altered to be one of semi-gloss, satin or flat coat.

* * * * *